(12) United States Patent
Fleshman et al.

(10) Patent No.: US 6,700,252 B2
(45) Date of Patent: Mar. 2, 2004

(54) FIELD CONFIGURABLE MODULAR MOTOR

(75) Inventors: Roy R. Fleshman, Morrison, OK (US); Rick Bailey, Bartlesville, OK (US)

(73) Assignee: Schlumberger Technology Corp., Sugar Land, TX (US)

( * ) Notice: Subject to any disclaimer, the term of this patent is extended or adjusted under 35 U.S.C. 154(b) by 182 days.

(21) Appl. No.: 09/745,402

(22) Filed: Dec. 21, 2000

(65) Prior Publication Data

US 2002/0079763 A1 Jun. 27, 2002

(51) Int. Cl.$^7$ ................................................. H02K 5/10
(52) U.S. Cl. ........................... 310/87; 310/254; 310/88; 310/71
(58) Field of Search ........................... 310/254, 71, 87, 310/88, 171, 52, 85; 417/372, 375, 377, 421

(56) References Cited

U.S. PATENT DOCUMENTS

| | | |
|---|---|---|
| 1,840,994 A | 1/1932 | Winsor |
| 1,960,484 A * | 2/1934 | Ekstromer .................... 172/36 |
| 2,003,647 A | 6/1935 | Dillstrom |
| 3,548,273 A | 12/1970 | Parodi et al. |
| 4,215,283 A | 7/1980 | Hinds |
| 4,234,831 A | 11/1980 | Kemmer et al. |
| 4,329,122 A | 5/1982 | Owada et al. |
| 4,454,426 A | 6/1984 | Benson |
| 4,485,126 A | 11/1984 | Gaietto et al. |
| 4,548,552 A | 10/1985 | Holm |
| 4,562,385 A | 12/1985 | Rabson |
| 4,578,608 A | 3/1986 | Mech et al. |
| 4,631,230 A | 12/1986 | Torossian et al. |
| 4,687,054 A | 8/1987 | Russell et al. |
| 4,711,006 A | 12/1987 | Baldenko et al. |
| 4,815,949 A | 3/1989 | Rabson |
| 4,965,864 A | 10/1990 | Roth et al. |
| 5,518,379 A | 5/1996 | Harris et al. |
| 5,620,056 A | 4/1997 | Eppink |
| 5,734,209 A | 3/1998 | Hallidy |
| 5,785,509 A | 7/1998 | Harris et al. |
| 5,831,353 A | 11/1998 | Bolding et al. |
| 5,923,111 A | 7/1999 | Eno et al. |
| 5,939,813 A * | 8/1999 | Schob ......................... 310/254 |

FOREIGN PATENT DOCUMENTS

| | | |
|---|---|---|
| EP | 0092138 | 4/1983 |
| EP | 0 361 925 A2 | 4/1990 |
| EP | 0 571 155 A1 | 11/1993 |
| GB | 299013 A | 5/1929 |
| GB | 603261 A | 6/1948 |
| GB | 2348743 | 10/2000 |
| JP | 09247911 | 9/1997 |
| WO | WO 8504771 | 10/1985 |

* cited by examiner

*Primary Examiner*—Thanh Lam
(74) *Attorney, Agent, or Firm*—Robert Van Someren; Jeffrey E. Griffin; Brigitte Jeffery Echols (57) ABSTRACT

A modular electric motor for use in a wellbore. The modular motor includes a plurality of modular motor sections. The modular motor sections being mechanically and electrically coupleable. At least one modular motor section having a rotor. The rotor of one modular motor section having a rotor being drivingly coupleable to the rotor of a second modular motor section having a rotor. Thus, a given motor may be assembled to a variety of desired lengths by connecting the appropriate number of modular motor sections.

20 Claims, 7 Drawing Sheets

FIELD CONFIGURABLE MODULAR MOTOR

FIELD OF THE INVENTION

The present invention relates generally to electric motors, and particularly to a modular motor that facilitates motor construction.

BACKGROUND OF THE INVENTION

Submersible electric motors are used in submersible pumping systems to lift wellbore fluids from depths of up to several thousand feet. A conventional motor used to provide the equivalent pumping power on the surface cannot be used in a wellbore because the diameter of such a motor would be too wide to fit into the wellbore. Therefore, as compared to short, thick surface motors, the stators of submersible electric motors are relatively thin and extremely elongated.

Elongating the stator allows the motor to produce the required torque to drive a pump by developing magnetic force over a stator of a much larger length. Thus, if long enough, a motor that produces a relatively smaller torque per foot can produce a sufficient total torque. Depending on the horsepower required of the motor, electric submersible pumping system motors can utilize stator assemblies thirty feet long or more. Preparation of the stator windings requires long, thin polished rods that serve as needles for pulling the insulated, conductor wires through a lengthy assembly of stator laminations. This conventional process is a comparatively slow and expensive process for manufacturing such motors. Additionally, repair or rebuilding of such motors often requires complete destruction or tear down of the motor with little component repair value due to the unitary stator assembly.

It would be advantageous to have a modular motor that could be used to construct motors in the field, such as motors utilized in electric submersible pumping systems. Benefits of such a modular construction would include reduced cost and assembly time, reduced repair time and reduced motor component inventory.

SUMMARY OF THE INVENTION

The present invention features a modular electric motor. The modular electric motor comprises a plurality of motor sections selectively coupleable, mechanically and electrically, to form electric motors in a variety of desired lengths. The modular electric motor features a rotor in each motor section that is drivingly coupleable to at least one other motor section.

According to another aspect of the invention, a submersible pumping system is featured. The submersible pumping system includes a submersible electric motor and a submersible pump. The submersible electric motor has a plurality of motor sections which are mechanically and electrically coupleable to form a motor of a desired length. Each motor section has a modular stator section and a modular rotor section.

According to another aspect of the invention, a method is provided for facilitating the assembly of an electric motor. The method features the act of manufacturing a plurality of motor sections having modular stator and rotor components. The method further includes determining a desired motor horsepower for a given application, and connecting the modular components to assemble a motor of the required length and horsepower.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
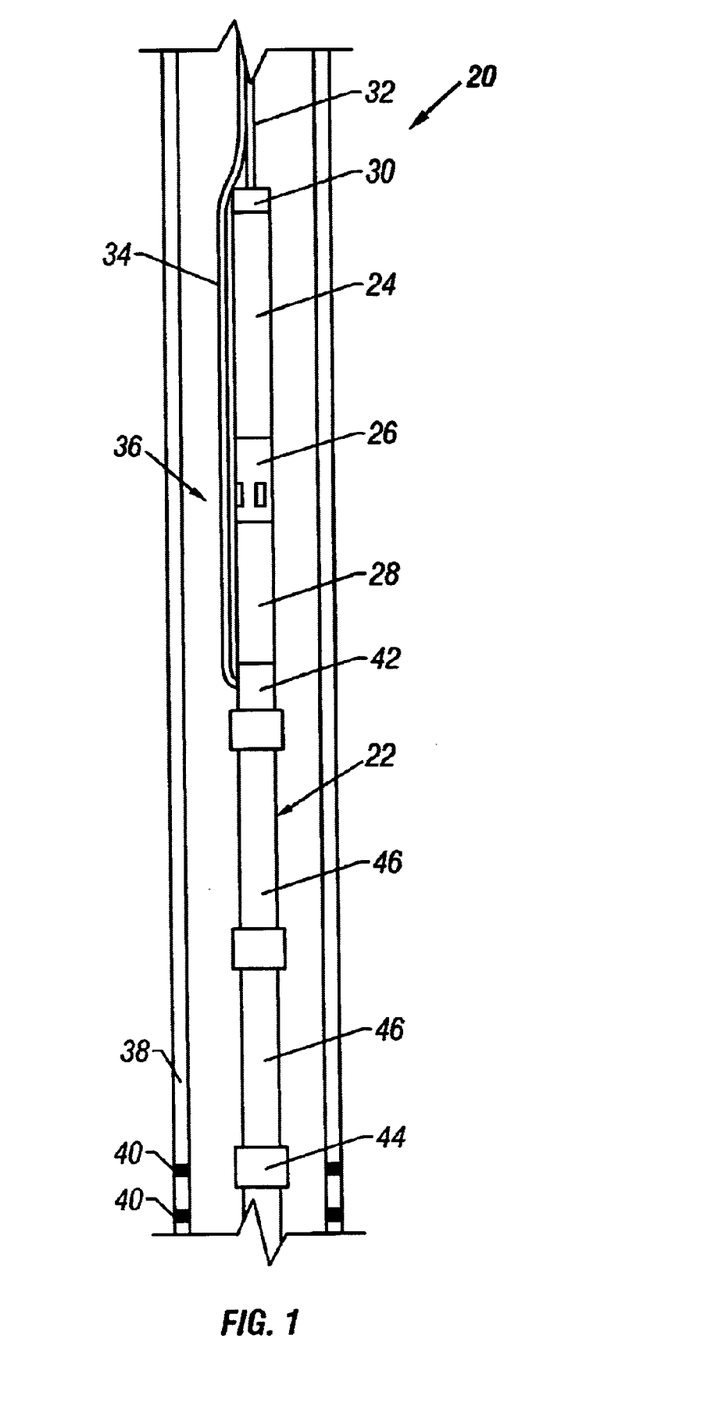
FIG. 1 is a front elevational view of a submersible pumping system that utilizes a submersible electric motor, according to a preferred embodiment of the present invention.

Referring generally to FIG. 1, a submersible pumping system 20 is shown that utilizes a modular electric motor 22, according to a preferred embodiment of the present invention. The submersible pumping system 20 may be comprised of a variety of components depending on the particular application or environment in which it is used. However, submersible pumping system 20 typically includes a submersible motor, such as modular electric motor 22, to drive a submersible pump 24. Fluid is drawn into the submersible pump 24 through a pump intake 26. Typically, a motor protector 28 is connected between submersible pump 24 and electric motor 22 to isolate well fluid from internal motor oil within motor 22. A connector 30 is used to connect the submersible pumping system to a deployment system 32, such as production tubing, cable or coil tubing. A multi-conductor cable 34 supplies three-phase alternating current (AC) electrical power from the surface to the motor 22.

Submersible pumping system 20 is designed for deployment in a wellbore 36 containing desirable production fluids, such as petroleum. In a typical application, wellbore 36 is drilled and lined with a wellbore casing 38. Holes 40 in the wellbore casing 38 allow production fluids to enter the wellbore 36. The submersible pumping system 20 is deployed within wellbore 36 to a desired location for pumping production fluids. Instead of a unitary stator, that may be thirty feet long or more, electric motor 22 utilizes modular motor sections. For example, motor 22 may include a top motor section 42, a bottom motor section 44, and two middle motor sections 46. Electricity flowing through the middle motor sections 46 produces a rotating magnetic field that causes a rotor within each of the middle motor sections to rotate. The rotors within the middle motor sections are coupled together and drivingly coupled through the motor protector 28 and pump intake 26 to the submersible pump 24.

Although two middle motor sections 46 are illustrated, the exact number of middle motor sections 46 in a given submersible electric motor 22 can vary depending on the system requirements. During assembly, the modular motor sections are assembled to form electric motor 22. In the event of repair or servicing, the modular motor sections can be disassembled and uncoupled as necessary. For example, if a particular motor section requires replacement, the surrounding components can be uncoupled, e.g. unplugged, and a replacement motor section inserted. This modular concept greatly simplifies the assembly, servicing, repair, and stocking of replacement components for electric motor 22.

Figure 2:
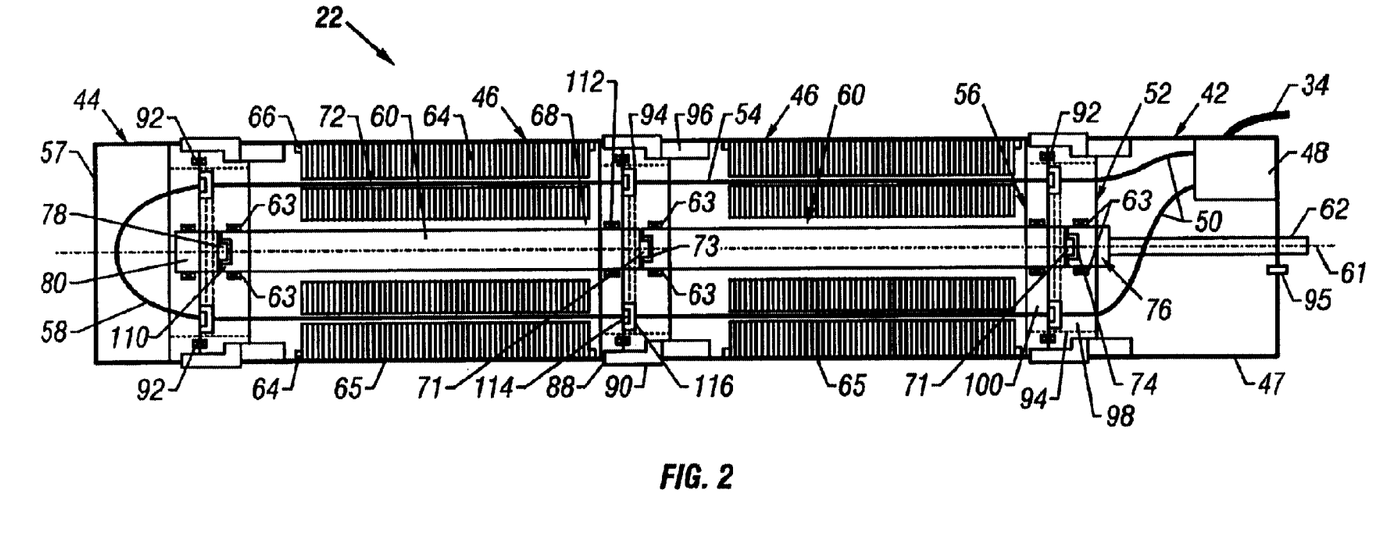
FIG. 2 is a cross-sectional view of the submersible electric motor illustrated in FIG. 1.

Referring generally to FIG. 2, a cross-sectional view is shown of submersible electric motor 22. Electric power from multi-conductor cable 34 is coupled through an outer housing 47 of stator section 42 to an electrical connector 48 of the stator section 42. Conductors 50 in cable 34 are coupled to a female connector 52 in top motor section 42. Conductors 54 in middle motor section 46 are coupled to a male electrical connector 56. When top motor section 42 is mated to middle motor section 46, conductors 50 in top motor section 42 are electrically coupled to conductors 54 in the first middle motor section 46. In this view, for clarity, only two conductors 54 are shown extending through each middle stator section 46. Typically, there are multiple conductors for each single conductor shown here. Furthermore, as will be more fully discussed in the following paragraphs, there are multiple groups of these multiple conductors oriented around a central axis.

Conductors 54 of middle motor section 46 extend longitudinally through middle motor section 46 to another female connector 52. This female connector is designed to engage the male connector 56 of the second middle motor section 46. Similarly, conductors 54 extend through the second middle motor section 46 to another female connector 52. Bottom motor section 44 also has a male connector 56, disposed within an outer housing 57, and conductors 58 of bottom motor section 44 are coupled to male connector 56. When bottom motor section 44 is mated to the second middle motor section 46, conductors 58 of bottom motor section 44 electrically couple each conductor 54 of middle motor section 46 with a corresponding conductor 54 disposed through the middle motor section 46 at a different location.

In the illustrated embodiment, each middle motor section 46 is formed with male connector 56 at one end and female connector 52 at the other end. This allows a plurality of middle motor sections 46 to be coupled together end-to-end. Additionally, the top motor section 42 is configured with a female connector 52 and the bottom motor section 44 is configured with a male connector 56. Note that the selection of whether a top or bottom motor section is to be male or female is entirely arbitrary, as long as the selection is consistent so that the modular stator sections can be assembled together.

When the modular stator sections are joined, the conductors in the top, middle and bottom motor sections are electrically coupled to a source of electrical power on the surface. Electricity flowing through conductors 54 produces a rotating magnetic field that causes a rotor 60 within each of the middle motor sections 46 to rotate. Each rotor 60 is coupled together, and ultimately, to a shaft 62 that rotates pump 24. Bearings 63 are used to support each rotor 60. The magnetic field that causes rotation of rotor 60 is prompted by a plurality of metallic laminations 64 that are stacked together and held in place within an outer housing 65 by snap rings 66, as in conventional stator construction.

Figure 3:
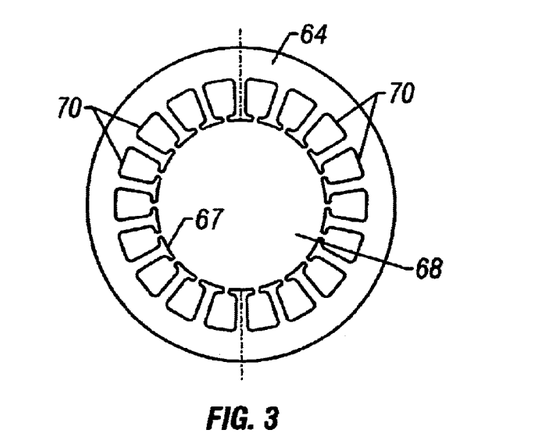
FIG. 3 is an end view of a stator lamination from the motor of FIG. 2.

As best illustrated in FIG. 3, each metallic lamination 64 has a central opening 67. As laminations 64 are stacked to form a middle motor section 46, central openings 67 form an interior passage or opening 68 that extends through the middle motor section 46 in which rotor 60 is disposed. Laminations 64 also have a plurality of openings 70 that are radially outlying from the central opening 67. As laminations 64 are stacked, openings 70 are aligned to create longitudinal slots 72. Typically, multiple conductors 54 are inserted through each of the longitudinal slots 72. The lamination stacks are disposed within outer housing 65.

Motor sections may be drivingly coupled to each other in a variety of ways. In the illustrated embodiment, a typical middle motor section 46 has a protrusion 71 at one end of rotor 60 and a recess 73 at the opposite end of rotor 60. Protrusion 71 of one rotor 60 is configured to mate with recess 73 of an adjacent rotor 60 so that the two rotors are drivingly coupled together. In the illustrated embodiment, a recess 74 in a coupler 76 of top motor section 42 is configured to mate with protrusion 71 of rotor 60 in an adjacent middle motor section 46. Additionally, a protrusion 78 of a coupler 80 in bottom motor section 44 is configured to mate with recess 73 in the rotor 60 of an adjacent middle motor section 46. Coupler 76, in top motor section 42, is drivingly coupled to shaft 62. Ultimately, shaft 62 is drivingly coupled to pump 24. Shaft 62 and rotor 60 rotate about axis 61.

Other methods of drivingly coupling motor sections could include protrusions and recesses configured in a variety of polygonal shapes, including octagonal and hexagonal. Alternatively, a motor section could be configured with a spline for engagement with a respective motor section configured with a spline shaft.

Modular motor sections may be mechanically coupled together in a variety of ways. In the illustrated embodiment, mechanical coupling is provided by plug connectors 52, 56, and by threaded collar assemblies mounted to the external housings 47, 57 and 65. The modular motor sections 42, 44 and 46 are configured with either male threaded end 88 or female threaded collar 90 formed as part of or mounted to the corresponding outer housing 47, 57 or 65. Seal 92, such as an O-ring, a crush ring, or a metal-to-metal seal, maintains a fluid seal between the inside of motor 22 and the wellbore 36. A passageway 94 allows motor oil to pass from one modular motor section to another. A passageway 95 allows motor oil to pass from the modular motor to motor protector 28.

Figure 4:
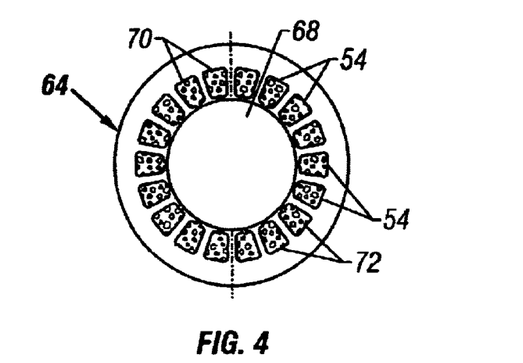
FIG. 4 is an end view of conductors, i.e. windings, extending through radial openings in the stator lamination illustrated in FIG. 3.

Referring generally to FIG. 4, a cross-sectional view is shown of a metallic lamination 64 with a plurality of conductors 54 wound through each axial opening 70. However, as described above, FIGS. 2, 9 and 10 only illustrate one conductor 54 disposed through each axial opening 70 for clarity.

Figure 5:
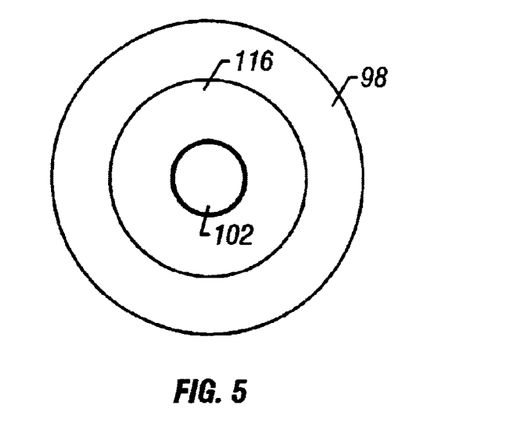
FIG. 5 is an end view of a portion of a female insulated block and female terminations for the conductive windings.
Figure 6:
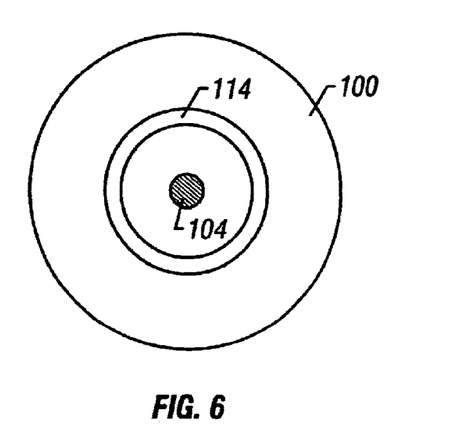
FIG. 6 is an end view of a portion of a male insulated block and male terminations for the conductive windings.

Referring generally to FIGS. 5 and 6, each group of conductors disposed through the axial opening 70 is terminated in an insulated block in the connectors. Female connector 52 has a female insulated block 98, while male connector 56 has a male insulated block 100. The insulated blocks insulate the conductors, e.g. bare copper wires, from one another. The insulated blocks may be readily formed from a moldable polymeric material. Exemplary insulating materials include polyetheretherketone (PEEK), kapton, and mylar.

In the illustrated embodiment, the plurality of conductive strands, disposed through each axial opening 70, are terminated in the insulated blocks with a single electrical termination. This reduces the overall number of electrical terminations that must be completed between modular motor modules. However, each conductor could have it's own individual termination. Conductors that are terminated at female insulated block 98 are terminated with a female termination 102, while conductors terminated in male insulated block 100 are terminated with a male termination 104. Male termination 104 is disposed within a raised portion 114 of male insulated block 100, while female termination 102 is disposed in a recess 116 in female insulated block 98. When two modular motor sections are abutted, raised portion 114 of male insulated block 100 is inserted into recess 116 in female insulated block 98. This causes male terminations 104 to be guided and inserted into female terminations 102.

Figure 7:
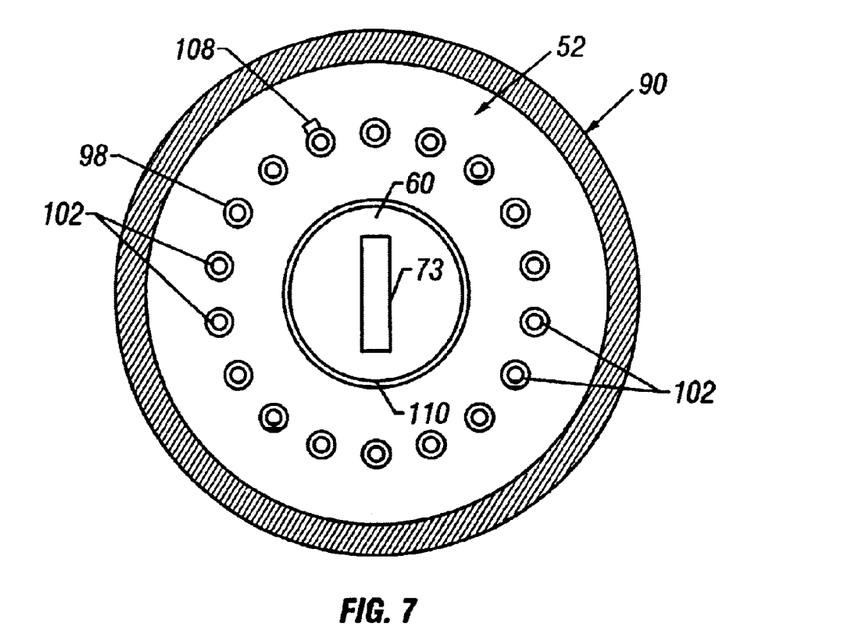
FIG. 7 is an end view of a modular motor section having a female end.
Figure 8:
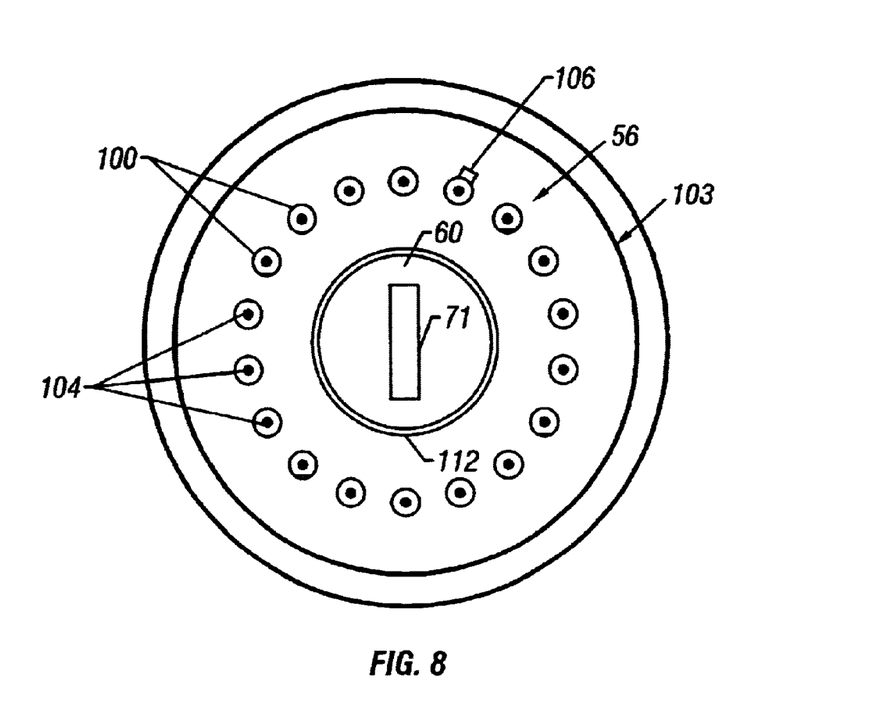
FIG. 8 is an end view of a modular motor section having a male end.

Referring generally to FIG. 7, a female end of a middle motor section 46 is illustrated. This view illustrates female threaded collar 90 and recess 73 in rotor 60. Female connector 52 is surrounded by threaded collar 90, having internal threads 101. In FIG. 8, an end view of the male end of a middle motor section 46 is illustrated. Rotor 60 includes protrusion 71. Male connector 56 is surrounded by threaded end 74, having external threads 103. Radial alignment of the two ends is provided by a key 106 and keyway 108.

Figure 9:
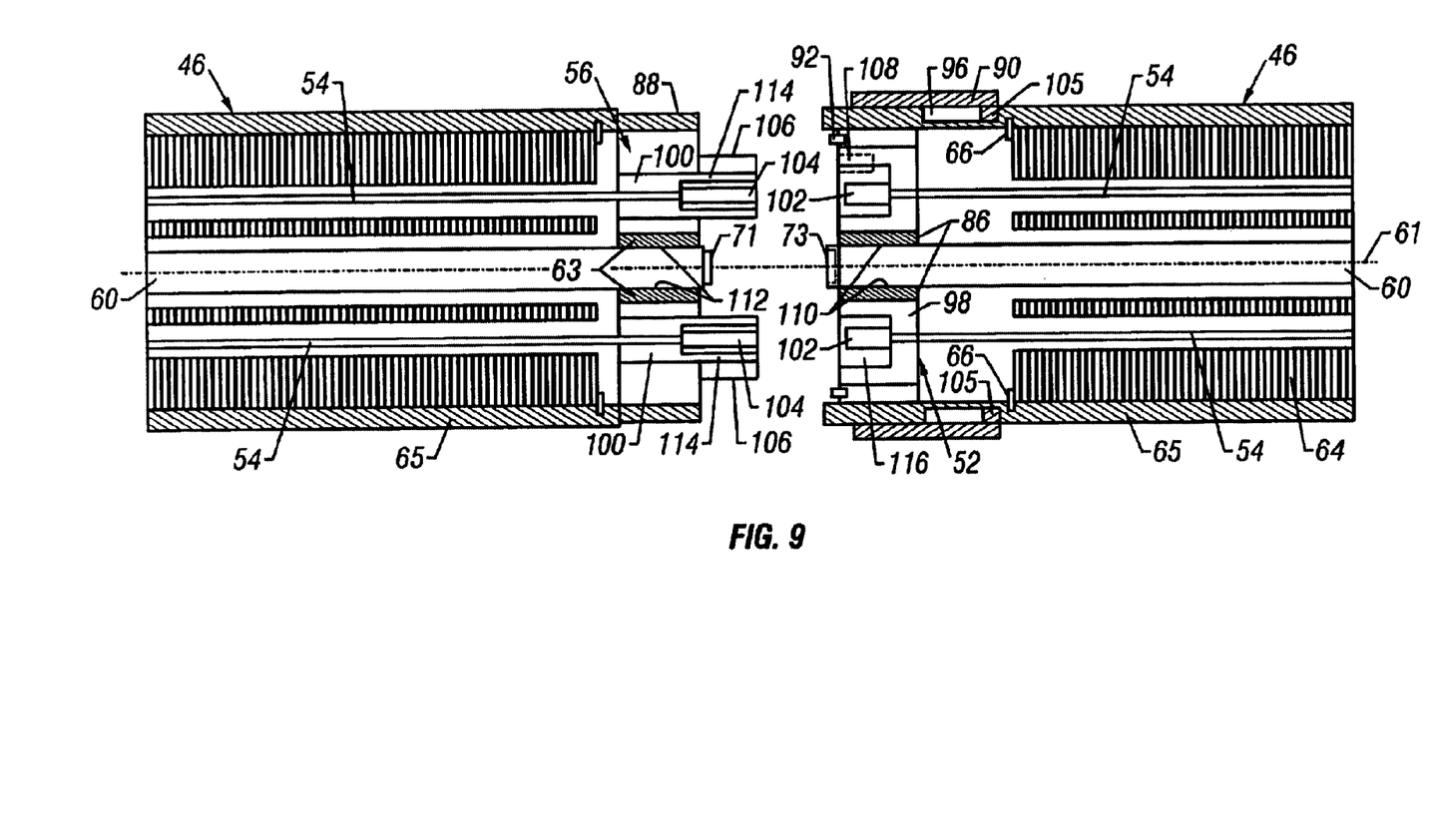
FIG. 9 is a cross-sectional view of two modular motor sections prior to coupling.
Figure 10:
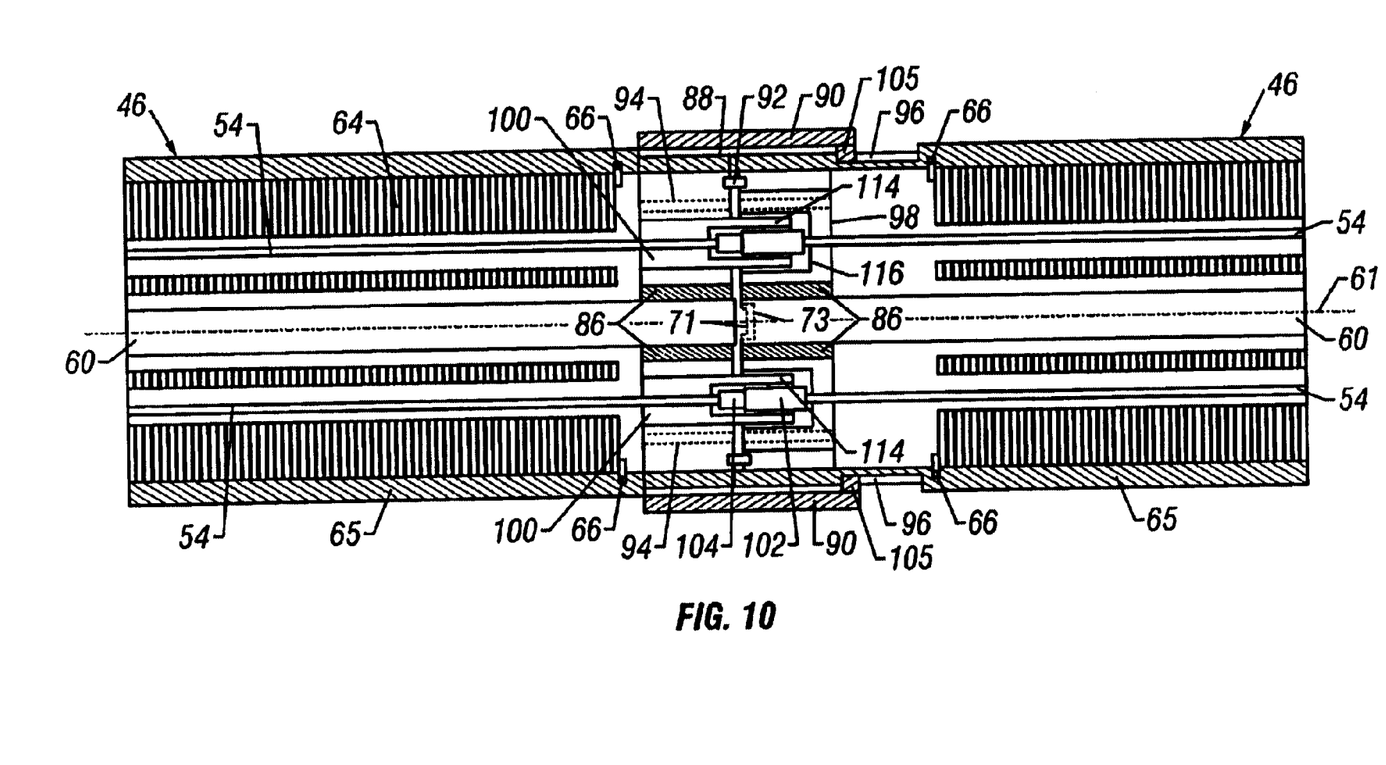
FIG. 10 is a cross-sectional view of two modular motor sections coupled together.

Referring generally to FIGS. 9 and 10, cross-sectional views are shown illustrating the process of joining two middle motor sections 46. In FIG. 9, the two middle motor sections 46 have not yet been joined. The threaded female collar 90 is moveable along a slot 96 in the outer housing, e.g. housing 65, of the motor section. Typically, collar 90 includes a ring 105 captured in slot 96 such that collar 90 is retained to the appropriate outer housing.

Initially, the threaded female collar 90 is pulled away from the end of the modular motor section 46 on which it is mounted. With the ends exposed, the two modular motor sections 46 are axially aligned and brought together. In the illustrated embodiments, the insulated blocks and terminations are aligned with the key 106 and keyway 108 system and the protrusion and recess on the rotors are aligned. Once aligned, the two sections are brought together.

Coupling is accomplished by forcing the two motor sections together so that the male terminations 88 of one middle motor section 46 are inserted into the female terminations 90 of the next adjacent middle motor section 46. Additionally, protrusion 71 is inserted into recess 73. Once joined, threaded collar 90 is tightened over threaded end 88, as illustrated in FIG. 10. This ensures a secure coupling of the components. Top motor section 42 and bottom stator section 44 may be joined to the appropriate ends of middle stator sections 46 in a similar fashion.

Figure 11:
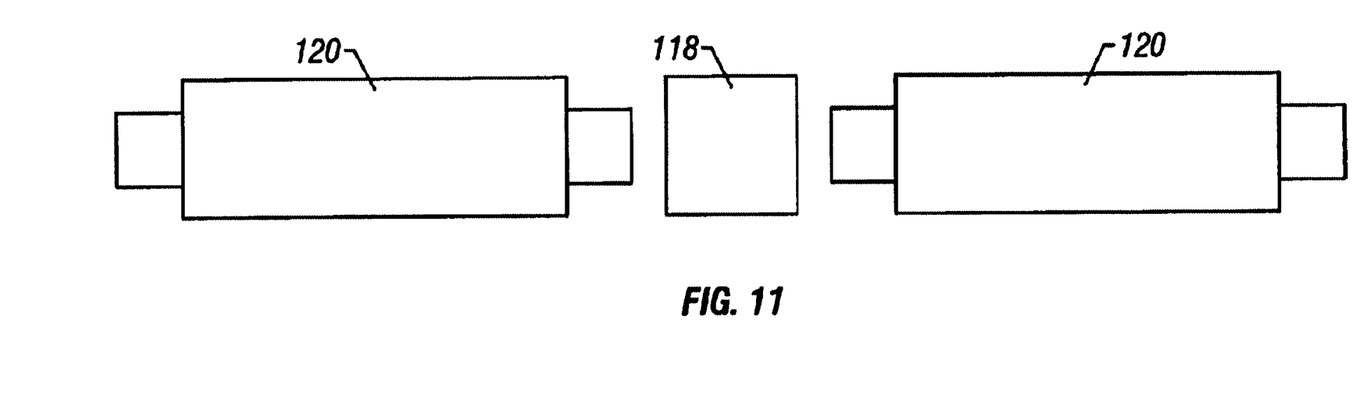
FIG. 11 is an alternative embodiment of an electric motor illustrating a coupling device to couple two middle motor sections.
Figure 12:
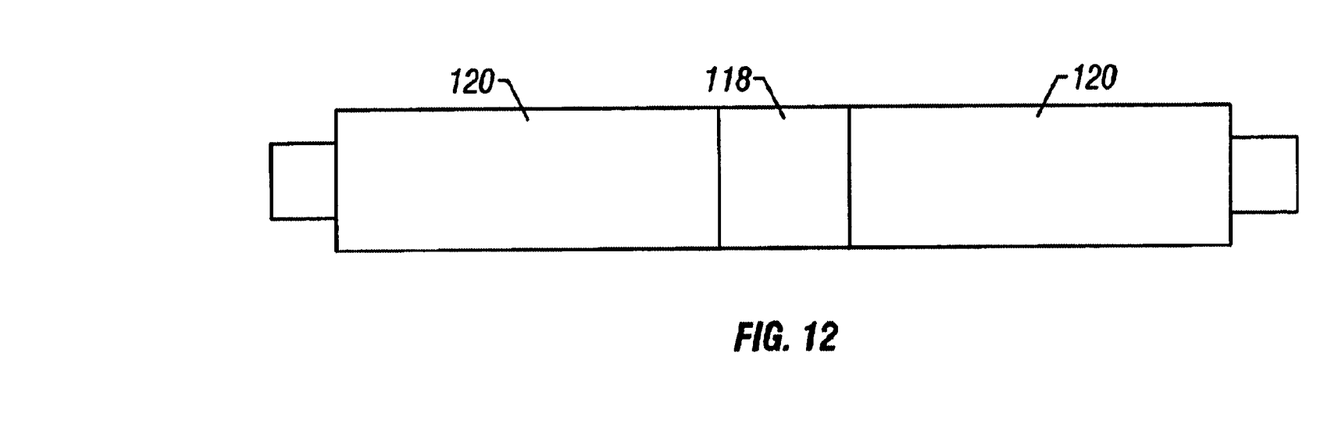
FIG. 12 is an alternative embodiment of an electric motor featuring two middle motor sections coupled together.

An alternate embodiment of the present invention is illustrated in FIGS. 11 and 12. Separate coupler 118 is used to couple two middle motor sections 120, according to an alternative embodiment of the present invention. In this embodiment, a separate coupler 118 may be configured such that middle motor sections 120 are electrically, mechanically, and drivingly coupled through coupler 118. Alternatively, coupler 118 may be configured such that middle motor sections 120 are mechanically coupled through coupler 118, but drivingly coupled directly to each other.

It will be understood that the foregoing description is of a preferred embodiment of this invention, and that the invention is not limited to the specific form shown. For example, more or less than two middle motor sections 46 could be coupled together to form a motor of a desired length. Furthermore, a variety of different methods and configurations can be can be used to electrically and mechanically couple the modular motor sections together. Indeed, various plug configurations and coupling structures can be used to combine components. Furthermore, different motor styles and types may benefit from the modular construction described above. The subject motor may also be utilized in a variety of systems and environments. These and other modifications may be made in the design and arrangement of the elements without departing from the scope of the invention as expressed in the appended claims.

What is claimed is:

1. An electric motor, comprising:
   a plurality of motor sections, wherein the plurality of motor sections are mechanically and electrically coupleable to form a single motor, each motor section including a modular rotor section and a modular stator section having a plurality of independent conductors; and
   a bottom motor section electrically coupleable to a lower modular motor section of the plurality of modular motor sections, the bottom motor section having a plurality of corresponding conductors to conductively connect the plurality of independent conductors to form a single stator.

2. The electric motor as recited in claim 1, wherein the plurality of motor sections includes:
   a first motor section having a fist modular rotor section and a first modular stator section; and
   a second motor section having a second modular rotor section coupleable to the first modular rotor section and a second modular stator section electrically coupleable to the first stator section, wherein electricity flowing through the first and second modular stator sections produces a magnetic field to impart rotative motion in the rotor.

3. The electric motor as recited in claim 2, wherein the first motor section and the second motor section are coupleable fluidally to allow fluid to pass between the first and second motor sections.

4. The electric motor as recited in claim 2, wherein the second motor section is coupleable fluidally to an external device.

5. The electric motor as recited in claim 2, further comprising a seal disposed between the first motor section end and the second motor section.

6. The electric motor as recited in claim 2, further comprising a separate coupler disposed between the first and second motor sections to provide a mechanical and electrical coupling.

7. The electric motor as recited in claim 2, comprising a third motor section adapted to complete electrically the single stator formed by the first modular stator section and the second modular stator section.

8. The electric motor as recited in claim 1, wherein the plurality of motor sections are coupleable fluidally to allow fluid to pass between the plurality of motor sections.

9. The electric motor as recited in claim 1, wherein at least one modular stator section has a plurality of conductors terminating at a plurality of corresponding protrusions.

10. The electric motor as recited in claim 9, wherein at least one other modular stator section includes a plurality of conductive elements configured for engagement with the plurality of corresponding protrusions when the plurality of motor sections are mechanically coupled.

11. The electric motor as recited in claim 9, wherein the plurality of conductive elements each include a hollow receptacle configured to receive a corresponding protrusion.

12. The electric motor as recited in claim 1, wherein at least one of the plurality of motor sections includes an outer housing having a threaded collar designed to engage an outer housing of the next sequential motor section.

13. The electric motor as recited in claim 1, wherein each modular stator section comprises a first stator winding extending linearly through the modular stator section to a second stator winding extending linearly through an adjacent modular Stator section.

14. The electric motor as recited in claim 1, wherein the modular stator sections are coupled electrically in series.

15. A submersible pumping system, comprising;
   a submersible electric motor, comprising:
      a plurality of motor sections, wherein the plurality of motor sections are mechanically and electrically coupleable to form a single motor of a desired length, each motor section comprising:
         a modular rotor section coupleable to an adjacent modular rotor section of an adjacent motor section to form a rotor, and
         a modular stator section coupleable to an adjacent modular stator section of the adjacent motor section; and
      a bottom motor section, wherein the modular stator section has a plurality of independent conductors that remain electrically disconnected until the bottom motor section is coupled to one of the plurality of modular motor sections to complete electrically a stator; and
   a submersible pump drivingly coupled to the rotor of the submersible electric motor.

16. The submersible electric motor as recited in claim 15, wherein the plurality of motor sections comprises:
   a first motor section having a first rotor section and a first stator section; and
   a second motor section having a second rotor section coupleable to the first rotor section and a second stator section electrically coupleable to the first stator section, wherein electricity flowing through the first and second stator sections produces a magnetic field to impart rotative motion in the rotor.

17. The system as recited in claim 15, further comprising a motor protector, wherein the plurality of motor sections are fluidally coupleable to allow fluid to pass between the first motor section and the motor protector.

18. An electric motor, comprising:
   a plurality of motor sections, wherein the plurality of motor sections are mechanically and electrically coupleable to form a motor of a desired length, the plurality of motor sections having a plurality of modular rotor sections and a plurality of comprising modular stator sections having longitudinal conductors that remain electrically isolated until the longitudinal conductors are electrically coupled via a plurality of corresponding conductors disposed in a modular end section.

19. The electric motor as recited in claim 18, wherein the plurality of modular stator sections are adapted to form a single stator from when electrically coupled in series.

20. The electric motor as recited in claim 18, comprising a bottom motor section adapted to complete electrically the modular stator sections.

* * * * *